United States Patent
Tanaka et al.

[11] Patent Number: 6,062,269
[45] Date of Patent: May 16, 2000

[54] REFRIGERANT CONVEYING HOSE

[75] Inventors: Hiroshi Tanaka; Yoshihiro Ishii; Toshinori Ishii, all of Kanagawa-ken, Japan

[73] Assignee: Kabushiki Kaisha Meiji Gomu Kasei, Tokyo, Japan

[21] Appl. No.: 09/091,399

[22] PCT Filed: Feb. 19, 1997

[86] PCT No.: PCT/JP97/00452

§ 371 Date: Jun. 19, 1998

§ 102(e) Date: Jun. 19, 1998

[87] PCT Pub. No.: WO97/31212

PCT Pub. Date: Aug. 28, 1997

[30]  Foreign Application Priority Data

Feb. 20, 1996  [JP]  Japan .................................. 8-056778

[51] Int. Cl.[7] .................................................. F16L 11/04
[52] U.S. Cl. ........................ 138/126; 138/137; 138/141; 138/DIG. 1; 138/DIG. 7
[58] Field of Search ..................................... 138/124, 125, 138/126, 137, 141, 146, DIG. 1, DIG. 7

[56]  References Cited

U.S. PATENT DOCUMENTS

| | | | |
|---|---|---|---|
| 4,593,062 | 6/1986 | Puydak et al. | 524/426 |
| 4,802,938 | 2/1989 | Kitami et al. | 138/126 |
| 4,845,145 | 7/1989 | Hazelton et al. | 524/426 |
| 4,880,036 | 11/1989 | Kitami et al. | 138/125 |
| 4,881,576 | 11/1989 | Kitami et al. | 138/177 |
| 5,013,793 | 5/1991 | Wang et al. | 525/195 |
| 5,051,478 | 9/1991 | Puydak et al. | 525/195 |
| 5,084,314 | 1/1992 | Igarashi et al. | 138/125 |
| 5,264,262 | 11/1993 | Igarashi | 138/125 |
| 5,462,091 | 10/1995 | Saupe | 138/126 |
| 5,488,974 | 2/1996 | Shiota et al. | 138/137 |
| 5,574,105 | 11/1996 | Venkataswamy | 525/179 |
| 5,706,865 | 1/1998 | Douchet | 138/125 |
| 5,804,269 | 9/1998 | Ozawa et al. | 138/137 |

*Primary Examiner*—James Hook
*Attorney, Agent, or Firm*—Arent Fox Kintner Plotkin & Kahn PLLC

[57]  ABSTRACT

A refrigerant conveying hose, being wholly made of a synthetic resin, is formed of an inner tube forming an inner side layer, an intermediate layer on the outer periphery surface of the inner tube, a fiber reinforced layer on the outer periphery surface of the intermediate layer and an outer tube forming the outer covering layer. The inner layer is formed of any one of (1) an thermoplastic resin alloyed of a polyamide resin and an olefin based elastomer, (2) an thermoplastic resin alloyed of a copolymer of a polyamide resin and an olefin based elastomer, (3) an thermoplastic resin alloyed of a polyamide resin and an urethane based elastomer and (4) an thermoplastic resin alloyed of a copolymer of a polyamide resin and an urethane based elastomer, the intermediate layer is formed of an thermoplastic resin material alloyed of a polypropylene (PP) and a isobutylene-isoprene rubber (IIR), an adhesive for bonding the inner tube and the intermediate layer is formed of a specific resin based adhesive, the outer tube is formed of an thermoplastic resin material alloyed of a polypropylene (PP) and an ethylene propylene diene monomer rubber (EPDM), and the resulting hose is molded out thereof.

5 Claims, 1 Drawing Sheet

REFRIGERANT CONVEYING HOSE

TECHNICAL FIELD

The present invention relates to a refrigerant conveying hose serving as a piping hose adapted to convey a refrigerant for an air conditioning apparatus or cooling means in an automobile and so on.

BACKGROUND ART

There has heretofore been used generally a fluorocarbon gas and particularly a dichloro-difluoromethane (hereinafter referred to as a CFC12) as a refrigerant for an air conditioning apparatus or cooling means in an automobile and so on. However, since it has become apparent that the CFC12 has exerted bad influences upon human health in that it destroys the ozonosphere to thereby cause skin carcinomas, an application of the CFC12 has been restricted. Then, a trifluoro-monofluoroethane (hereinafter referred to as a HFC134a) being less destructive of the ozonosphere is considered as a replacement thereof.

While it is urged to confirm the safety of the replacement gas as soon as possible, it is increasingly expected that measures for conveying the gas works in safety and without any maintenance thereof. Conventionally, such a hose as illustrated in FIG. 1 is used as a hose for conveying a refrigerant gas such as a fluorocarbon etc. The refrigerant conveying hose comprises an inner tube 1 made of a synthetic resin, an intermediate rubber layer 5 adhered to on the inner tube 1 through an adhesive 3, a fiber reinforced layer 7 provided on the outer periphery surface of the intermediate rubber layer 5 and an outer tube 9 provided on the fiber reinforced layer 7.

Referring to each material of the above hose in which a fluorocarbon gas is employed as a refrigerant, the inner tube 1 is formed of a resin material with an excellent refrigerant-impermeability such as a polyamide resin (PA), the intermediate rubber layer 5 is formed of a isobutylene-isoprene rubber (IIR) or a chlorinated isobutylene-isoprene rubber (CI-IIR) each having a good moisture-impermeability and refrigerant-impermeability, the fiber reinforced layer 7 is formed of a polyester fiber, a rayon fiber or a nylon fiber etc., and the outer tube 9 is formed of a chlorinated butyl rubber (CI-IIR), an ethylene propylene diene monomer rubber (EPDM) or a chloroprene rubber (CR) etc. each having a good oil resistance and weathering resistance.

Such a refrigerant conveying hose is manufactured, for example, according that the above layers are sequentially laminated one by one as below.

(a) A synthetic resin for the inner tube 1 is extruded over a mandrel of made a rubber or resin material by an extrusion molding machine to thereby form a tubular body. After an adhesive applied to on the inner tube 1 is devolatilized, the intermediate rubber layer 5 is molded through the extrusion molding machine.

(b) Next, the fiber reinforced layer 7 is provided on the intermediate rubber layer 5 by measures of a braid or spiral knitting of reinforcing fiber threads.

(c) After a prescribed adhesive is applied to the outer periphery surface of the fiber reinforced layer 7 as formed above, the outer tube 9 with a predetermined wall thickness is molded thereon through the extrusion molding machine.

(d) At last, the resulting laminated tube is subjected to a steam vulcanization under the condition that a vulcanizing temperature and time are usually around 150 to 160° C. and 30 minutes to one hour, respectively.

Because the inner tube 1 is made of a polyamide resin (PA), the above laminated tube is largely improved in respect of a refrigerant-impermeability, as compared with anther conventional laminated tube using an acrylonitrile-butadiene copolymer rubber (NBR) or a chlorosulfonated polyethylene rubber (CSM) as a material of the inner tube 1. However, since a polyamide resin material has a high rigidity, there is a problem that the resulting tube lacks a necessary flexibility. On the other hand, when the thickness of the wall of the inner tube 1 is made thinner in order to take on a sufficient flexibility, there happens another problem that a refrigerant-impermeability to be targeted is not attained.

As each material of the intermediate rubber layer 5 and the outer layer 9, the chlorinated butyl rubber (CI-IIR) and the ethylene propylene diene monomer rubber (EPDM) are used respectively, which involves the vulcanizing process to eventually reduce the yield and raise the manufacturing cost. This hose includes a laminated body of the different materials such that the inner tube 1 and the intermediate rubber layer 5 are made of the resin material and the rubber material respectively, therefore it causes a problem that the hose, as it is, could not be recycled. Further, the vulcanizing process, being indispensable due to an employment of the rubber layer, breeds the necessity of an additional treatment for preventing the reinforcing fiberthreads fromshrinking. Conventionally, as measures for preventing the shrinkage, a shrinkage-reducing treatment such as a heat-setting and so on has been carried out. Meanwhile, there exists another problem that an increasing demand for lightening of the hose in recent years is not necessarily satisfied because of use of the rubber layer.

Accordingly, the present invention is directed to overcome the above-mentioned deficiencies inherent to the conventional refrigerant conveying hose, and an object of the present invention is to provide a refrigerant conveying hose intended to get lightened in weight wherein the flexibility is improved than ever while the excellent refrigerant-impermeability remains unchanged.

Another object of the present invention is to provide a refrigerant conveying hose which has no laminated structure of deferent kind of materials to thereby get recyclable.

An even further object of the present invention is to provide a refrigerant conveying hose intended to get reduced in a manufacturing cost wherein the extrusion molding process is simplified by using the same kind of materials.

DISCLOSURE OF THE INVENTION

A refrigerant conveying hose relating to the present invention is provided with an inner tube forming an inner side layer, an intermediate layer disposed on the outer periphery surface of the inner tube, a fiber reinforced layer disposed on the outer periphery surface of the intermediate layer, and an outer tube forming an outer covering layer, wherein the inner layer is formed from any one of (1) an thermoplastic resin obtained by alloying a polyamide resin and an olefin based elastomer, (2) an thermoplastic resin obtained by alloying a copolymer of a polyamide resin and an olefin based elastomer, (3) an thermoplastic resin obtained by alloying a polyamide resin and an urethane based elastomer, and (4) an thermoplastic resin obtained by alloying a copolymer of a polyamide resin and an urethane based elastomer, the intermediate layer is formed from an thermoplastic resin comprising an alloyed material of a polypropylene PP) and a isobutylene-isoprene rubber IIR), as an adhesive for bonding the inner tube and the intermediate layer, there is used a specific resin based adhesive, and the outer tube is formed from an thermoplastic resin comprising an alloyed material of a polypropylene PP) and an ethylene propylene diene monomer rubber EPDM).

Since the refrigerant conveying hose of the present invention is wholly formed of a synthetic resin material as described above, in the manufacturing process, it dispenses with the vulcanizing process and requires only the extrusion molding means, and therefore it brings a cost reduction of the hose product due to a reduction of its manufacturing cost. The hose is wholly formed of a synthetic resin material without employing any combination of the rubber and the resin material as used for the conventional hose, accordingly, a shape or configuration of the resulting hose can be altered (by a bending treatment) as desired by means of heat treatment (postcure) thereof, and also the hose product becomes good in flexibility and dissipation ability of vibration. The refrigerant conveying hose of the present invention can get lightened in weight than any conventional hoses by 20 to 30% through using a low specific gravity material. Moreover, the hose is wholly made of a thermoplastic resin, and hence it is recyclable, specifically, it can be reclaimed as a resin material being pelletized or melted.

BEST MODE OF CARRYING OUT THE INVENTION

Figure 1:
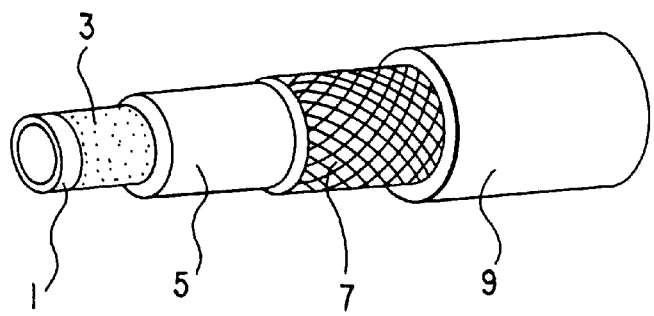
FIG. 1 is a partially cutaway perspective view of a laminated structure of a conventional refrigerant conveying hose.
Figure 2:
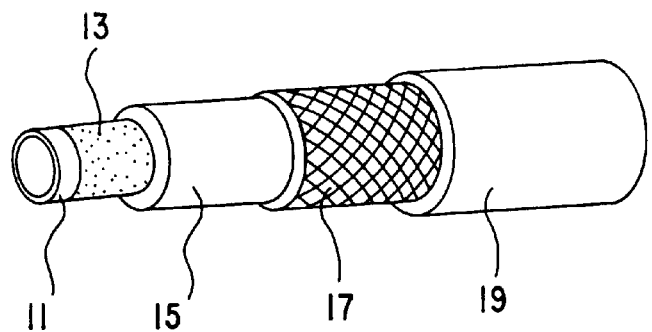
FIG. 2 is a partially cutaway perspective view of a laminated structure of the refrigerant conveying hose according to the present invention.

The geometric structure of the refrigerant conveying hose relating to the present invention is the same as that of the conventional one. As illustrated in FIG. 2, an intermediate layer 15 is provided on an inner tube 11 through an adhesive layer 13 by means of an extrusion molding, a fiber reinforced layer 17 is formed on the outer periphery surface of the intermediate layer 15, and further an outer tube 19 is formed on the fiber reinforced layer 17.

Such a refrigerant hose may be produced, for example, in such a manner that the above-mentioned layers are subsequently laminated step by step as below.

(a) The inner tube 11, the adhesive layer 13 and the intermediate layer 15 each of a synthetic resin are extruded together by using a three-layer resin extruder to provide the tubular body. At this time, the adhesive layer 13 maybe omitted if the adhesive is blended with the intermediate layer 15.

(b) Next, the fiber reinforced layer 17 is provided on the intermediate rubber layer 15 by means of a braid or spiral knitting of reinforcing fiber threads.

(c) After a prescribed adhesive is applied to the outer periphery surface of the fiber reinforced layer 17 as formed above, the outer tube 19 with a predetermined wall thickness is formed thereon through an extrusion molding machine.

With respect to a thermoplastic resin alloyed of a polyamide resin or a copolymer thereof and an olefin based elastomer, for example, such resins are available as those sold by Toyobo Co. Ltd, under the trade name "Toyobo Nylon (PA6)T-222SN" (the old name "TS-222SI") and by Ube Industries, Ltd under the trade name "Ube Nylon (PA12) 1024 I X1" (the old name "3035 X 29"). As for a thermoplastic resin alloyed of a polyamide resin and a copolymer thereof and an urethane based elastomer, for instance, the product sold by Toyobo Co. Ltd, under the trade name "Toyobo Nylon A0-50" is available. The flexibility and dissipation ability of vibration of the resulting hose may be enhanced by using either of a thermoplastic resin alloyed of a polyamide resin or a copolymer thereof and an olefin based elastomer, and another thermoplastic resin alloyed of a polyamide resin and a copolymer thereof and an urethane based elastomer.

In respect of a thermoplastic resin of the alloyed material of a polypropylene and an isobutylene-isoprene rubber, the product sold by Advanced Elastomer Systems under the trade name "Trefsin" is available. Because the intermediate layer 15 is formed of a resin material not a rubber material as used conventionally, the resulting hose can be lightened owing to a low specific gravity of the used material while keeping its moisture-permeability resistance and refrigerant-permeability resistance unchanged as ever, and as the vulcanizing process is removed, a manufacturing cost can be reduced correspondingly.

In the adhesive layer 13 for bonding the inner tube 11 and the intermediate layer 15, such an adhesive is available as those having, as a main component, any of an urethane based polymer, a modified polyolefin polymer, graft modified polyolefin polymer, ethylene-vinyl acetate and the mixture of any of these polymers. Any of these adhesive layers may be provided by an extrusion molding or coating treatment. As an example of an adhesive having a modified polyolefin polymer as its main component, such an adhesive is available as that sold by Advanced Elastomer System under the trade name "Santoprene 191-85" (the old name "LEXT 2416"). As for an adhesive having a graft modified polyolefin polymer as its main component, for instance, such an adhesive is available as that sold by Mitsui Petrochemistry Co. Ltd. under the trade name "ADMER".

The inner tube 11 and the intermediate layer 15 may be bonded through the adhesive layer 13 interposed therebetween, otherwise they may be directly bonded after any adhesive is blended with the material of the intermediate layer 15. In the former case, when the inner tube 11 and the intermediate layer 15 are subjected to an extrusion molding, the adhesive layer 13 may be extruded together therewith to resultingly intervene therebetween. In the latter case, the adhesive is blended with the material of the intermediate layer 15 and then the intermediate layer 15 is bonded to the inner tube 11 in one united body when extruded. In the case of blending the adhesive with the material of the intermediate layer 15, the ratio of the adhesive to the material of the intermediate layer 15 preferably falls into the range of 1 to 5%. As described above, according to the present invention, the adhesive layer 13 can be extruded together with the intermediate layer 15 for a extrusion molding, and in the case of blending the adhesive with the material of the intermediate layer 15, the intermediate layer 15 can be united so firmly with the inner tube as to improve further a refrigerant-permeability and moisture-permeability. It also leads to reduce the manufacturing cost due to the simplified process.

The fiber reinforced layer 17 on the outer periphery surface of the intermediate layer 15 may be constituted by a synthetic fiber such as a polyvinyl alcohol (PVA), a polyethylene terephthalate (PET), an aliphatic polyamide (PA) and an aromatic polyamide (aramid). The present invention dispenses with the vulcanizing process to thereby prevent a deterioration of the used fiber which would be caused when vulcanized, accordingly it is no longer necessary to carry our any treatment for preventing shrinkage of the reinforcing fiber threads. As it is enabled to prevent any occurrences of deterioration of the fiber when vulcanized, the number of the fiber woven into the reinforced layer may be decreased without reducing its reinforceability. If the above number is decreased, the flexibility and the dissipation ability of vibration of the hose are raised still further in addition to the existing improved flexibility attributable to the inner tube.

As an example of a thermoplastic resin, for the outer tube 19, of the alloyed material of a polypropylene (PP) and an ethylene propylene diene monomer rubber (EPDM), such a resin is available as that sold by Advanced Elastomer System under the trade name "Santoprene". Because such a thermoplastic resin is employed, the resulting hose not only becomes good in heat resistance, fatigue resistance and oil resistance but also gets lightened as a whole owing to a low specific gravity of the thermoplastic resin. As the vulcanizing process is not required, the manufacturing cost can be reduced correspondingly.

EXAMPLES 1 and 2

Examples of the refrigerant conveying hose according to the present invention will be described.

Test hoses having the laminated structures as shown in the following Table 1 are prepared for Examples 1 and 2 of the present invention and a comparative example 1 (a conventional hose), there are examined and rated each of the hose weight, the refrigerant (HFC134a)-permeability, the moisture-permeability and the flexibility in the above respective example. The intermediate layer and the outer layer in the comparative example 1 are formed of the materials CI-IIR and EPDNM, respectively.

TABLE 1

| Items | Example 1 | Example 2 | Comparative example 1 |
|---|---|---|---|
| Hose structure | | | |
| Inner tube | PA (0.15 t) | PA (0.15 t) | PA (0.15 t) |
| Adhesive layer | Santoprene 191-85 (0.05 t) | Santoprene 191-85 (0.05 t) | Chemlok 234B |
| Intermediate layer | Trefsin 3101-65 (1.3 t) | Trefsin 3101-65 (1.3 t) | CI-IIR (1.3 t) |
| Resin reinforced layer | PET 3pcsx24C (*1) | PET 3pcsx24C (*1) | PET 3pcsx24C (*1) |
| Appearances | Santoprene 101-64 (1.3 t) | Santoprene 101-80 (1.3 t) | EPDM (1.3 t) |
| Refrigerant-permeability (g/cm/year) | 0.6 | 0.6 | 0.6 |
| Moisture-permeability (g/cm²/year) | 0.05 | 0.05 | 0.05 |
| Flexibility (kgf/R100) | 0.7 | 1.2 | 1.1 |
| Hose weight (g/m) | 160 | 160 | 200 |

*1 Three pieces of 3000 denier polyester fiber was taken up uniformly and woven by a machine braider with 24 carriers.
*2 A vulcanizing time condition 160° C. × 1 hour The examination for the rating was carried out based upon "Refrigerant (HFC134a) hose for an automobile air conditioning apparatus" (hereinafter referred to as JRA Specification 2012) which is a standard specification of Japan Refrigeration and Air Conditioning Industry Association (JRA)

The refrigerant-permeability is defined as an amount of permeation being resulted from that the above test hoses each containing the refrigerant (HFC134a) at the rate of 0.6±0.1 g per cubic centimeter of the hose inner volume are sealed hermetically and left as it is at 80° C. and for 72 hours. The moisture-permeability is defined as an amount of permeation being measured, similarly based upon JRA Specification 2012, in such a way that the above test hoses each containing a synthetic zeolite at the rate of 0.5±0.1 g per cubic centimeter of the hose inner volume are sealed hermetically and left as it is for 240 hours at the atmosphere of temperature 60° C. and humidity 95%. The flexibility is defined as a reaction force F, as illustrated FIG. 3, which is measured when one end of the hose is fixed to a stationary portion 20 and bent at 180 degrees.

The hose weight is shown as a weight per meter in length which is converted from an entire weight of each hose.

As seen from the above results, the hoses in Examples 1 and 2 are more excellent in the flexibility and more lightened than the comparative example 1 while retaining the refrigerant-permeability and the moisture-permeability as ever.

Subsequently, there are shown in Table 2 various test results obtained based upon JRA Specification 2012 with respect to the test hoses having the laminated structures known in Example 1, Example 2 and a comparative example 1. As seen also from the outcome of Table 1, each of the hoses in Examples 1 and 2 has a sufficient quality for the refrigerant conveying hose.

TABLE 2

| Items | Test condition | Example 1 | Example 2 | Comparative Example 1 |
|---|---|---|---|---|
| Pressure test | 54 g/cm² × 5 min | No troubles | No troubles | No troubles |
| Airtightness test | 36 g/cm² × 5 min | No troubles | No troubles | No troubles |
| Low temperature test | −30° C. × 24 h | No troubles | No troubles | No troubles |
| Ozone cracking test | 40° C. × 50 pphm × 72 h | No troubles | No troubles | No troubles |
| Accelerated aging test | 120° C. × 168 h | No troubles | No troubles | No troubles |
| Refrigerant-permeability (g/cm²/year) | 80° C. × 72 h | 0.6 | 0.6 | 0.6 |
| Moisture-permeability (g/cm²/year) | 60° C. × 95% RH × 240 h | 0.05 | 0.05 | 0.05 |

As shown in Table 3, Examples 3–6 are concerned with the tubular bodies obtained by extruding the three layers of the inner tube, the adhesion layer and the intermediate layer together through an extrusion molding machine, and comparative examples 2–4 are referred to concerning another tubular bodies each obtained from the conventional hose from which the fiber reinforced layer and the outer layer are removed. The results of rating the adhesive property, the flexibility and the heat resistibility are presented in Table 3.

As for the adhesive property, that between the inner layer and the intermediate layer is rated. The adhesive property is rated in the three cases of tests of: the first test wherein the original and whole hose without being pretreated is subjected to a peeling test; the second test wherein the hose dipped in a toluene liquid for 24 hours is subjected to the peeling test; and the third test wherein the peeling test is conducted after the hose is subjected to an accelerated aging treatment for heat-deterioration at 120° C. and for 168 hours by using a Gear oven aging tester. In the outcome of the tests, the symbol(○) shows that the test hose is broken at or during the peeling so the test cannot be carried out, the symbol(Δ) indicates that the test hose is peeled into pieces, and the symbol (X) indicates that there is no bonding in the test hose.

In respect of the heat-resistance, after an accelerated aging is conducted at 120° C. and for 168 hours in the Gear oven aging tester, it is confirmed whether there are any cracks in the tubular body or not. In the results, the symbols (○) denotes that any cracks never appear and the symbols (X) denotes that the cracks appear.

Figure 3:
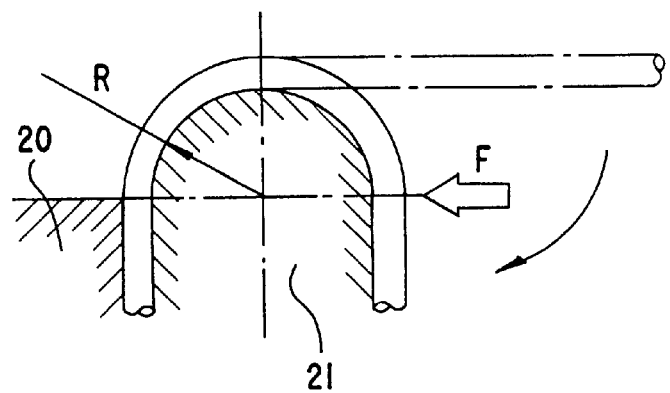
FIG. 3 is a view for explaining how to measure the flexibility.

The flexibility is rated, in the same manner as those of Examples 1 and 2, by measuring the reaction force F when the hose is bent at 180 degrees according to the method in FIG. 3.

TABLE 3

| Items | Example 3 | Example 4 | Example 5 | Example 6 | Comparative example 2 | Comparative example 3 | Comparative example 4 |
|---|---|---|---|---|---|---|---|
| Tubular body | | | | | | | |
| Inner tube | PA 5033J12 | PA 5033J12 | PA 5033J12 | PA 10241X1 | PA 5033J12 | PA 5033J12 | PA 5033J12 |
| Adhesive layer | Santoprene 191-85 | ADMER QF305 | ADMER QF500 | ADMER QF500 | None | Chemlok 481 | Chemlok 243B |
| Intermediate layer | Trefsin 3101-65 | Trefsin 3101-65 | Trefsin 3101-65 | Trefsin 3101-65 | Trefsin 3101-65 | Trefsin 3101-65 | Trefsin 3101-65 |
| Adhesive property | | | | | | | |
| Whole tube not pretreated | ○ | ○ | ○ | ○ | X | Δ | Δ |
| After dipped in toluene | ○ | ○ | ○ | ○ | X | Δ | X |
| After accelerated aging | ○ | ○ | ○ | ○ | X | X | X |
| Heat-resistance | ○ | ○ | ○ | ○ | ○ | ○ | ○ |
| Flexibility (kgf/R100) | 0.25 | 0.50 | 0.50 | 0.45 | 0.20 | 0.25 | 0.30 |

As apparent from Table 3, the tubular bodies in Examples 3–6 are good in the adhesive property, in particular, the results in Example 3 are satisfactory in every test item.

EXAMPLES 7–11

EXAMPLES 7–11 relates to the tubular bodies obtained by extruding three layers of the inner tube, the adhesion layer and the intermediate layer together through an extrusion molding machine for rating the adhesive property and the flexibility thereof, wherein the extruding material is prepared by blending the intermediate layer (Trefsin 3101-65) with the adhesive layer (Santoprene 194-85) at the ratio as shown in Table 4. These rating results are presented in Table 4. Further, a test piece sample (a sheet) is made of the resulting blended material so that the moisture-permeability thereabout is measured, and then such results are shown in Table 5.

The adhesive property between the inner layer and the intermediate layer is examined, and the rating thereof is carried out according to the three step examinations like the above Examples 3–6. In the first test the original and whole hose without being pretreated is handled, in the second test the hose dipped in a toluene liquid for 24 hours is used, and in the third test the hose subjected to an accelerated aging at 120° C. and for 168 hours is employed. The symbol (○) shows that the test hose is broken at or during the peeling so that the peeling test cannot be carried out, the symbol (Δ) indicates that the test hose is detached into pieces, and the symbol (X) indicates that there is no bonding in the test hose.

The flexibility is rated, in the same manner as those of Examples 1 to 6, by measuring the reaction force F when the hose is bent at 180 degrees according to the method in FIG. 3.

Regarding the moisture-permeability, the weight changes (decrements) of the test hose are measured based upon ASTM D-814 (a cup method) every 24 hours.

TABLE 4

| Items | Example 7 | Example 8 | Example 9 | Example 10 | Example 11 | Comparative example 5 |
|---|---|---|---|---|---|---|
| Tubular body | | | | | | |
| Inner tube | PA 5033J12 | PA 5033J12 | PA 5033J12 | PA 5033J12 | PA 5033J12 | PA 5033J12 |
| Blending ratio of adhesive | 0.5% | 1% | 3% | 5% | 7% | 0% |
| Adhesive property | | | | | | |
| Whole hose not pretreated | Δ | ○ | ○ | ○ | ○ | X |
| After dipped in toluene | Δ | ○ | ○ | ○ | ○ | X |
| After accelerated aging | X | ○ | ○ | ○ | ○ | X |
| Flexibility (kgf/R100) | 0.25 | 0.25 | 0.40 | 0.50 | 0.70 | 0.20 |

TABLE 5

| Items | | Example 7 | Example 8 | Example 9 | Example 10 | Example 11 | Comparative example 5 |
|---|---|---|---|---|---|---|---|
| Tubular body | Blending ratio of adhesive | 0.5% | 1% | 3% | 5% | 7% | 0% |
| Moisture-permeability (mg · mm/cm$^2$/24 h) | | 6.8 | 7.0 | 7.2 | 7.8 | 18.5 | 6.5 |

As the above results make it clear, the bonding between the inner tube and the intermediate layer is realized as long as the adhesive layer (Santoprene 191-85) is blended with the intermediate layer (Trefsin 3101-65) at the ratio of no less than 1%. On the other hand, if the above ratio falls into the range of no less than 5%, the flexibility and the moisture-permeability are reduced though the adhesive property continues to be excellent. Accordingly, the blending ratio of the adhesive preferably falls into the range of 1 to 5%.

Possibility of Industrial Utilization

As mentioned above, the refrigerant conveying hose is useful for a piping hose for an air conditioning and a cooling means in an automobile and is suitable for a conveying hose for a fluorocarbon gas, in particular, a trifluoromonofluoroethane.

We claim:

1. A refrigerant conveying hose which comprises
   an inner tube forming an inner side layer,
   an intermediate layer disposed on the outer periphery surface of the inner tube,
   a fiber reinforced layer disposed on the outer periphery surface of the intermediate layer, and
   an outer tube forming an outer covering layer;
   said inner tube being formed from a thermoplastic resin obtained by alloying a polyamide resin or a copolymer thereof and a urethane based elastomer with dynamic vulcanization, or another thermoplastic resin obtained by alloying a polyamide resin or a copolymer thereof and a urethane based elastomer with dynamic vulcanization;

said intermediate layer being formed from a thermoplastic resin material comprising a dynamically vulcanized alloy of a polypropylene (PP) and an isobutylene-isoprene rubber (IIR); wherein said inner tube and said intermediate layer are bonded with a specific resin based adhesive;

said outer tube being formed from a thermoplastic resin material comprising a dynamically vulcanized alloy of a polypropylene (PP) and an ethylene propylene diene monomer rubber (EPDM).

2. The refrigerant conveying hose according to claim 1, wherein the inner tube and the intermediate layer are bonded to each other via an adhesive layer formed between the inner tube and the intermediate layer.

3. The refrigerant conveying hose according to claim 1, wherein the inner tube and the intermediate layer are directly bonded to each other by mixing the adhesive with the intermediate layer.

4. The refrigerant conveying hose according to claim 1, wherein as the specific resin based adhesive, there is used one adhesive selected from the group consisting of an urethane based polymer, a modified polyolefin polymer, a graft modified polyolefin polymer and ethylene-vinyl acetate.

5. A refrigerant conveying hose according to any one of claim 1, 2 and 3, wherein as the specific resin based adhesive, there is used an adhesive mainly comprising a mixture of two or more of an urethane based polymer, a modified polyolefin polymer, a graft modified polyolefin polymer and ethylene-vinyl acetate.

* * * * *